(12) United States Patent
Tomita et al.

(10) Patent No.: US 9,318,814 B2
(45) Date of Patent: Apr. 19, 2016

(54) WIRE CONNECTION MEMBER, WIRE CONNECTION STRUCTURE AND ANNULAR POWER DISTRIBUTION MEMBER

(71) Applicant: Hitachi Metals, Ltd., Tokyo (JP)

(72) Inventors: Kazuhiko Tomita, Mito (JP); Kenichi Egami, Kitaibaraki (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 14/325,566

(22) Filed: Jul. 8, 2014

(65) Prior Publication Data

US 2015/0017845 A1 Jan. 15, 2015

(30) Foreign Application Priority Data

Jul. 9, 2013 (JP) ................................ 2013-143880

(51) Int. Cl.
*H01R 4/10* (2006.01)
*H01R 4/18* (2006.01)
*H02K 3/50* (2006.01)
*H01R 39/38* (2006.01)

(52) U.S. Cl.
CPC .................. *H01R 4/18* (2013.01); *H01R 4/186* (2013.01); *H02K 3/50* (2013.01); *H01R 39/383* (2013.01); *H02K 2203/09* (2013.01)

(58) Field of Classification Search
CPC .......... H01R 4/20; H01R 4/188; H01R 4/185; H01R 4/187
USPC ......................................... 439/879; 174/84 C
See application file for complete search history.

(56) References Cited

U.S. PATENT DOCUMENTS

| 2,884,478 | A | * | 4/1959 | Becker et al. ............... | 174/94 R |
| 2,965,699 | A | * | 12/1960 | Bollmeier .................... | 174/84 C |
| 3,045,303 | A | * | 7/1962 | Worth ............................ | 24/18 |
| 3,387,080 | A | * | 6/1968 | Dibble et al. ............... | 174/94 R |
| 3,514,528 | A | * | 5/1970 | Ray ............................. | 174/84 C |
| 3,715,705 | A | * | 2/1973 | Kuo ............................. | 439/422 |
| 3,767,841 | A | * | 10/1973 | Anderson et al. .......... | 174/84 C |
| 3,916,085 | A | * | 10/1975 | Hansen ....................... | 174/84 C |
| 4,442,316 | A |   | 4/1984 | Thuermer | |
| 5,151,560 | A | * | 9/1992 | Kreinberg et al. .......... | 174/94 R |
| 5,164,545 | A | * | 11/1992 | Kreinberg et al. .......... | 174/94 R |
| 5,316,506 | A | * | 5/1994 | Ito ................................. | 439/879 |

(Continued)

FOREIGN PATENT DOCUMENTS

FR 2029310 10/1970
GB 2088152 6/1982

(Continued)

OTHER PUBLICATIONS

Extended European Search Report dated Nov. 10, 2014.

*Primary Examiner* — Abdullah Riyami
*Assistant Examiner* — Vladimir Imas
(74) *Attorney, Agent, or Firm* — Roberts Mlotkowski Safran & Cole, PC

(57) ABSTRACT

A wire connection member for connecting a first wire to a second wire by crimping includes a partition for dividing a first housing space for housing tip portions of the first wire from a second housing space for housing a tip portion of the second wire, a first housing portion that, together with the partition, forms the first housing space, and a second housing portion that, together with the partition, forms the second housing space. The partition is arranged between the first and second housing portions.

5 Claims, 11 Drawing Sheets

(56) References Cited

U.S. PATENT DOCUMENTS

| | | | |
|---|---|---|---|
| 5,370,560 A * | 12/1994 | Ito | 439/877 |
| 5,986,374 A | 11/1999 | Kawakami | |
| 6,011,339 A | 1/2000 | Kawakami | |
| 7,462,081 B2 * | 12/2008 | Kato et al. | 439/877 |
| 7,828,591 B2 * | 11/2010 | Matsuoka | 439/559 |
| 2012/0319512 A1 | 12/2012 | Nakagawa | |

FOREIGN PATENT DOCUMENTS

| | | |
|---|---|---|
| JP | 2011-168104 | 9/2011 |
| WO | 9726700 | 7/1997 |
| WO | 2011/108734 | 9/2011 |

* cited by examiner

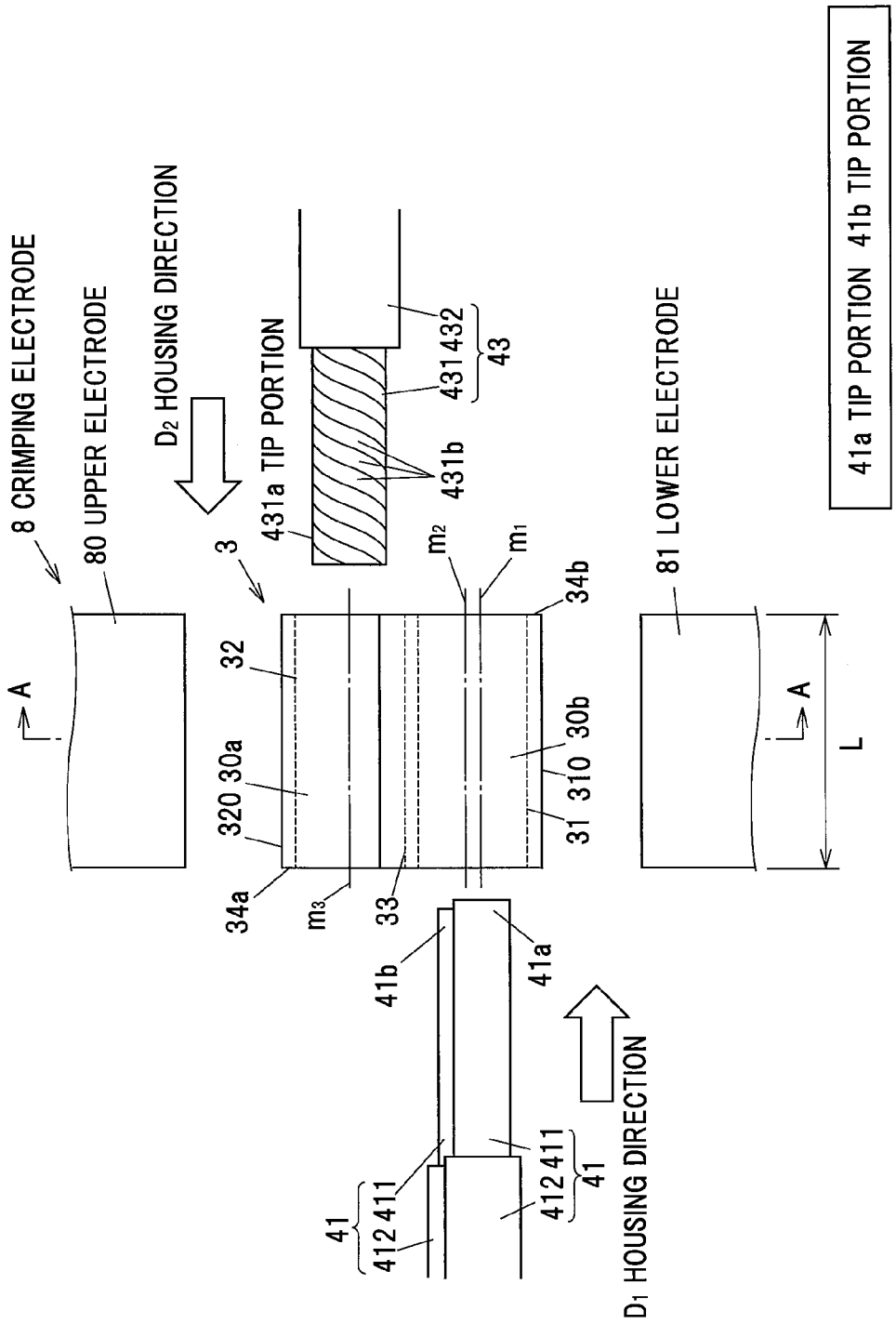

WIRE CONNECTION MEMBER, WIRE CONNECTION STRUCTURE AND ANNULAR POWER DISTRIBUTION MEMBER

The present application is based on Japanese patent application No. 2013-143880 filed on Jul. 9, 2013, the entire contents of which are incorporated herein by reference.

BACKGROUND OF THE INVENTION

1. Field of the Invention

The invention relates to a wire connection member for electrically connecting electric wires to each other, and a wire connection structure and an annular power distribution member each using the wire connection member.

2. Description of the Related Art

JP-A-2011-168104 discloses a wire connection structure in which a first wire formed by covering a solid core wire with an insulation resin is connected to a second wire formed by covering a stranded core wire, which is formed by twisting multiple strands, with an insulating resin.

The wire connection structure disclosed in JP-A-2011-168104 is produced such that the solid core wire is exposed by removing the insulating resin at an end portion of the first wire, the stranded core wire is exposed by removing the insulating resin at an end portion of the second wire, and the exposed core wires are arranged overlapped and connected to each other. The core wires are connected by e.g. ultrasonic welding or crimping using a crimp-on terminal.

JP-A-2011-168104 discloses examples of connection structure between a solid core wire and a stranded core wire. One example is a connection structure in which overlapped core wires are crimped together by a crimp-on terminal having a U-shaped cross section. Another example is a connection structure in which a solid core wire crimped to a first terminal and a stranded core wire crimped to a second terminal are connected by fitting the first and second terminals.

SUMMARY OF THE INVENTION

In connecting the solid core wire to the stranded core wire by crimping, the connection structure in which two core wires are crimped together may cause a problem that a crimping force may not be applied to some strands caught in a gap between the solid core wire and the crimp-on terminal and, therefore, the stranded core wire may be slipped out of the crimp-on terminal. Also, the connection structure in which the core wires each crimped to the first and second terminals are connected may cause a problem that the length of the connected portion (i.e., the length in a direction of fitting the first and second terminals) must increase when the first and second terminals are fitted since the core wires are not overlapped.

It is an object of the invention to provide a wire connection member that allows the first and second wires to be surely connected even when the end portions are arranged overlapped upon connection, as well as a wire connection structure and an annular power distribution member each using the wire connection member.

(1) According to one embodiment of the invention, a wire connection member for connecting a first wire to a second wire by crimping comprises:

a partition for dividing a first housing space for housing tip portions of the first wire from a second housing space for housing a tip portion of the second wire;

a first housing portion that, together with the partition, forms the first housing space; and a second housing portion that, together with the partition, forms the second housing space, wherein the partition is arranged between the first and second housing portions.

In the above embodiment (1) of the invention, the following modifications and changes can be made.

(i) The first and second housing portions are arranged side-by-side in a radial direction with respect to the axial direction of the first and second wires.

(ii) The first and second housing portions and the partition are formed integrally by bending a plate-like metal member.

(iii) The first and second housing portions are arranged adjacent to each other with the partition interposed therebetween, the partition comprising a single metal plate.

(2) According to another embodiment of the invention, a wire connection structure comprises:

the first wire and the second wire connected by the wire connection member according to the above embodiment (1), wherein the first wire comprises a solid wire, and the second wire comprises a twisted wire formed by twisting a plurality of strands.

In the above embodiment (2) of the invention, the following modifications and changes can be made.

(iv) The wire connection structure according to claim 5, wherein the first and second housing portions are compressed in an arrangement direction thereof with the partition interposed therebetween such that the first wire contacts with the first housing portion and the partition, the second wire contacts with the second housing portion and the partition and the first wire is thereby electrically connected to the second wire.

(3) According to another embodiment of the invention, an annular power distribution member comprises;

an annular wire comprising a solid wire formed in an annular shape and having connecting terminals fixed at a plurality of positions in the circumferential direction;

a power supply line comprising a twisted wire and supplying power to the annular wire; and a wire connection member connecting both end portions of the annular wire to a tip portion of the power supply line, wherein the wire connection member comprises a partition for dividing a first housing space for housing both end portions of the annular wire from a second housing space for housing a tip portion of the power supply line; a first housing portion that, together with the partition, forms the first housing space; and a second housing portion that, together with the partition, forms the second housing space, and the partition is arranged between the first and second housing portions.

EFFECTS OF THE INVENTION

According to one embodiment of the invention, a wire connection member can be provided that allows the first and second wires to be surely connected even when the end portions are arranged overlapped upon connection, as well as a wire connection structure and an annular power distribution member each using the wire connection member.

BRIEF DESCRIPTION OF THE DRAWINGS

Next, the present invention will be explained in more detail in conjunction with appended drawings, wherein:

FIGS. 1A and 1B show an electricity collection and distribution ring in a first embodiment of the present invention, wherein FIG. 1A is a perspective view and FIG. 1B is a front view as viewed from an axial direction of the electricity collection and distribution ring;

FIG. 5 is an explanatory diagram for explaining electrical connection between a first annular wire and a first power supply line using the first wire connection member;

FIGS. 6A and 6B show a crimping process, wherein FIG. 6A shows a state before crimping and FIG. 6B shows a state when the crimping is completed;

FIGS. 8A to 8D are projection views showing the wire connection member, wherein FIG. 8A is a front view, FIG. 8B is a plan view, FIG. 8C is a right side view and FIG. 8D is a bottom view;

FIGS. 9A and 9B are schematic views showing a process of crimping the wire connection member, wherein FIG. 9A shows a state before crimping and FIG. 9B shows a state after crimping;

FIGS. 11A and 11B are schematic views showing a process of crimping the wire connection member, wherein FIG. 11A shows a state before crimping and FIG. 11B shows a state after crimping.

DETAILED DESCRIPTION OF THE PREFERRED EMBODIMENTS

First Embodiment

Figure 1A:
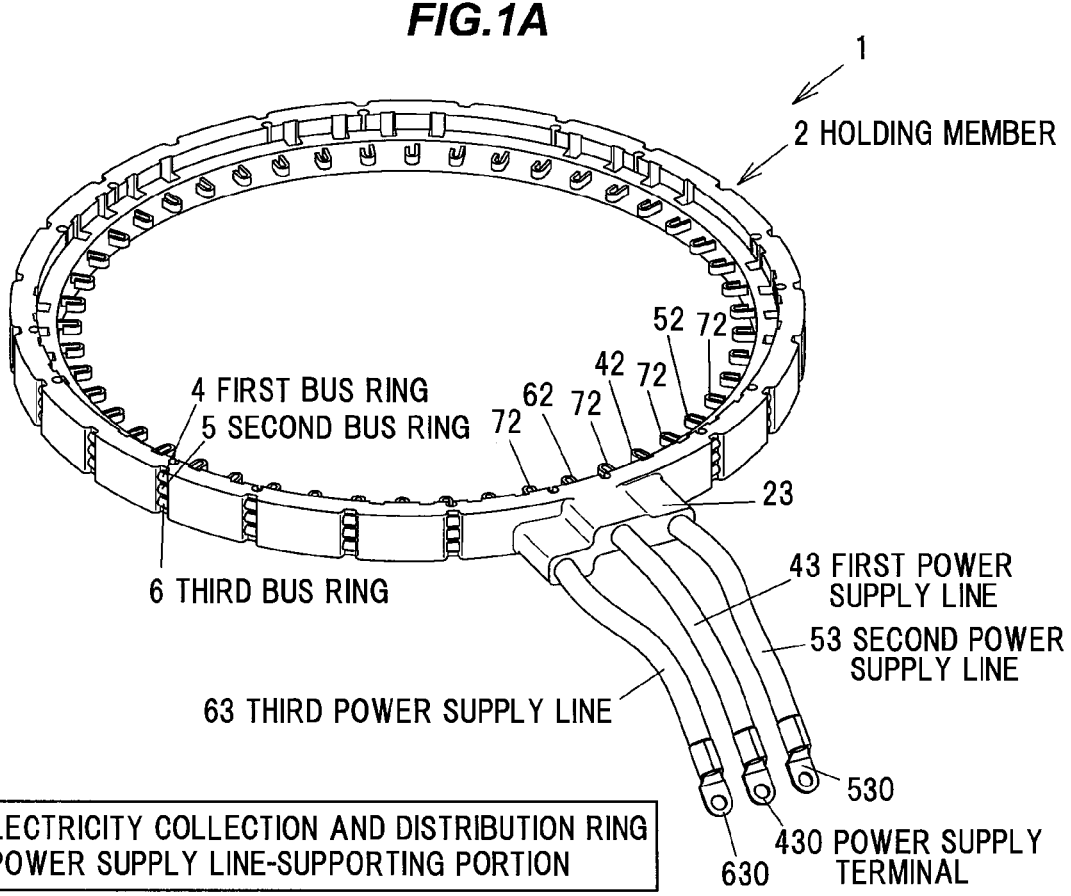
Figure 1B:
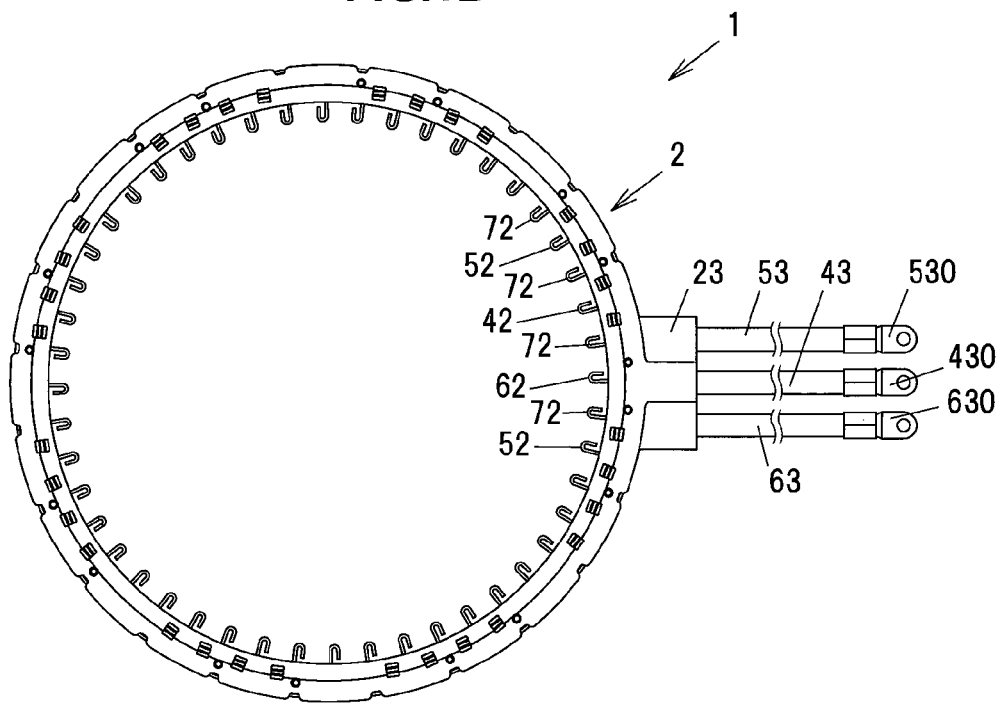
Figure 2:
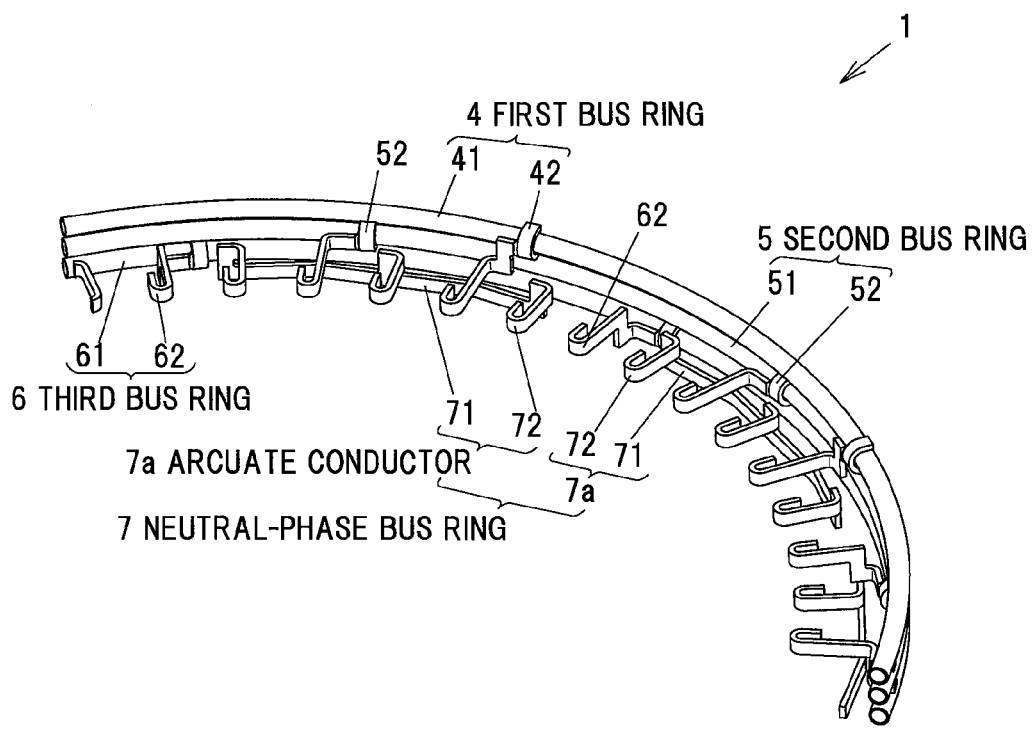
FIG. 2 is a partial enlarged view showing first to third bus rings and a neutral-phase bus ring of the electricity collection and distribution ring.
Figure 3:
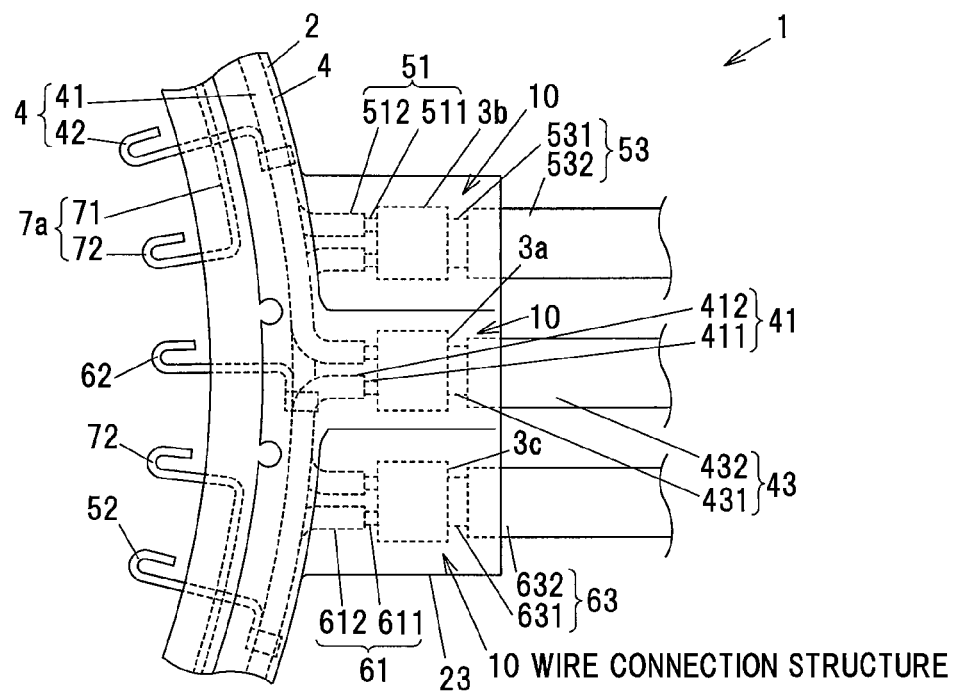
FIG. 3 is an explanatory structural diagram illustrating a wire connection structure at a power supply line-supporting portion of the electricity collection and distribution ring.

FIGS. 1A and 1B show an electricity collection and distribution ring in the first embodiment of the invention, wherein FIG. 1A is a perspective view and FIG. 1B is a front view as viewed from an axial direction of the electricity collection and distribution ring. FIG. 2 is a partial enlarged view showing first to third bus rings and a neutral-phase bus ring of the electricity collection and distribution ring. FIG. 3 is an explanatory structural diagram illustrating a wire connection structure at a power supply line-supporting portion of the electricity collection and distribution ring. It should be noted that, although the terms "upper" and "lower" are added to the names of some members and portions located on the upper or lower side of each drawing for convenience of explanation, these names are not intended to limited the direction in a used state or during manufacture to vertically up and down.

Configuration of Electricity Collection and Distribution Ring 1

An electricity collection and distribution ring 1 in the first embodiment is configured to, e.g., distribute a driving current to an electric motor mounted on a vehicle and to collect a current generated by the electric motor. Since this electric motor is a well-known three-phase AC motor, illustration thereof is omitted and only basic configuration will be briefly described.

The electric motor is provided with a rotor and a stator which generates a magnetic field to rotate the rotor. The stator has plural teeth arranged at equal intervals in a circumferential direction about a rotational axis of the rotor. AC currents of three phases (U-, V- and W-phases), all 120 degrees out of phase with one another, are supplied to the stator. U-, V- and W-phase windings are respectively wound around three teeth which are arranged side-by-side in a circumferential direction and form one set, and plural sets of three teeth are radially arranged on the stator. The electricity collection and distribution ring 1 in the first embodiment shown in FIGS. 1A to 2 is used for, e.g., collecting and distributing electricity from/to an electric motor having a stator on which eight sets of teeth with U-, V- and W-phase windings (eight teeth for each phase) are provided.

As shown in FIGS. 1A to 2, the electricity collection and distribution ring 1 is provided with first to third bus rings 4 to 6 as annular power distribution members, a neutral-phase bus ring 7 and an annular holding member 2 for holding the first to third bus rings 4 to 6 and the neutral-phase bus ring 7. The holding member 2 is molded into a shape adapted to hold the first to third bus rings 4 to 6 and the neutral-phase bus ring 7. Note that, in FIG. 2, illustration of the holding member 2 is omitted to show the first to third bus rings 4 to 6 and the neutral-phase bus ring 7 which are held thereinside.

The first bus ring 4 has a first annular wire 41 which is an insulated wire formed annularly around the rotational axis of the rotor of the electric motor, plural first connecting terminals 42 protruding radially inward from the first annular wire 41, and a first power supply line 43 and a power supply terminal 430 for supplying power to the first annular wire 41.

As shown FIG. 3, the first annular wire 41 is composed of a metal conductor 411 formed of a highly conductive metal such as copper and an insulation 412 formed of an insulating resin covering the outer periphery of the metal conductor 411. The metal conductor 411 in the first embodiment is a solid wire formed using one linear conductor having a circular cross section. The metal conductor 411 is partially exposed by removing the insulation 412, and the plural first connecting terminals 42 are fixed to the exposed metal conductor 411 by crimping and are thereby electrically connected to the metal conductor 411. Meanwhile, the first power supply line 43 is composed of a twisted wire 431 as a core formed by twisting strands made of a highly conductive metal such as copper and an insulation 432 formed of an insulating resin covering the outer periphery of the twisted wire 431.

The second bus ring 5 and the third bus ring 6 are configured in the same manner as the first bus ring 4. That is, the second bus ring 5 has a second annular wire 51, plural second connecting terminals 52 protruding radially inward from the second annular wire 51, and a second power supply line 53 and a power supply terminal 530 for supplying power to the second annular wire 51. The second annular wire 51 has a metal conductor 511 formed using a solid wire and an insulation 512 covering the metal conductor 511, and the plural second connecting terminals 52 are fixed by crimping to portions of the second annular wire 51 where the insulation 512 is removed. The second power supply line 53 is composed of a twisted wire 531 as a core and an insulation 532 formed of an insulating resin covering the outer periphery of the twisted wire 531.

In addition, the third bus ring 6 has a third annular wire 61, plural third connecting terminals 62 protruding radially inward from the third annular wire 61, and a third power supply line 63 and a power supply terminal 630 for supplying power to the third annular wire 61. The third annular wire 61 has a metal conductor 611 formed using a solid wire and an insulation 612 covering the metal conductor 611, and the plural third connecting terminals 62 are fixed by crimping to portions of the third annular wire 61 where the insulation 612 is removed. The third power supply line 63 is composed of a twisted wire 631 as a core and an insulation 632 formed of an insulating resin covering the outer periphery of the twisted wire 631.

The neutral-phase bus ring 7 is composed of plural arcuate conductors 7a each having an arc shape, and is formed in an annular shape as a whole by arranging the arcuate conductors 7a along a circumferential direction of the holding member 2. The arcuate conductor 7a is formed by plastically deforming a plate-like conductive member having a predetermined shape. The arcuate conductor 7a integrally has an arc portion 71 shaped into an arc shape by bending at plural positions and neutral-phase connecting terminals 72 protruding radially inward from the arc portion 71.

As shown in FIGS. 1A, 1B and 2, the first to third bus rings 4 to 6 are arranged in parallel to each other along the axial direction of the electricity collection and distribution ring 1. The neutral-phase bus ring 7 is arranged inside the first to third bus rings 4 to 6 in a radial direction of the electricity collection and distribution ring 1. The first to third connecting terminals 42, 52, 62 and the neutral-phase connecting terminal 72 each have a J-shape, as viewed from the axial direction of the electricity collection and distribution ring 1, of which curved portion formed by folding back a radially inward end portion protrudes radially inward from the inner peripheral surface of the holding member 2.

The first connecting terminal 42 of the first bus ring 4 is crimped and connected at a radially inward end portion to an end portion of the U-phase winding of the non-illustrated electric motor. Likewise, the second connecting terminal 52 of the second bus ring 5 is connected to an end portion of the V-phase winding and the third connecting terminal 62 of the third bus ring 6 is connected to an end portion of the W-phase winding. Other end portions of the U-, V- and W-phase windings are connected to the neutral-phase connecting terminals 72 of the neutral-phase bus ring 7.

As shown in FIG. 3, both end portions of the metal conductor 411 of the first annular wire 41 are connected to each other by a first wire connection member 3a inside a power supply line-supporting portion 23. Likewise, both end portions of the metal conductor 511 of the second annular wire 51 are connected to each other by a second wire connection member 3b inside the power supply line-supporting portion 23 and both end portions of the metal conductor 611 of the third annular wire 61 are connected to each other by a third wire connection member 3c inside the power supply line-supporting portion 23. Note that, in FIG. 3, the structure inside the holding member 2 formed of a molding resin is indicated by a dashed line.

A wire connection structure 10 inside the power supply line-supporting portion 23 will be described in detail below. Note that, the first wire connection member 3a, the second wire connection member 3b and the third wire connection member 3c are configured in the same manner and the first wire connection member 3a will be taken as an example to explain the wire connection structure 10 in the first embodiment. The wire connection structure 10 is a connection structure for connecting electric wires to each other and is configured to connect the first annular wire 41 to the first power supply line 43 by the first wire connection member 3a.

Configuration of First Wire Connection Member 3a and Wire Connection Structure

Figure 4:
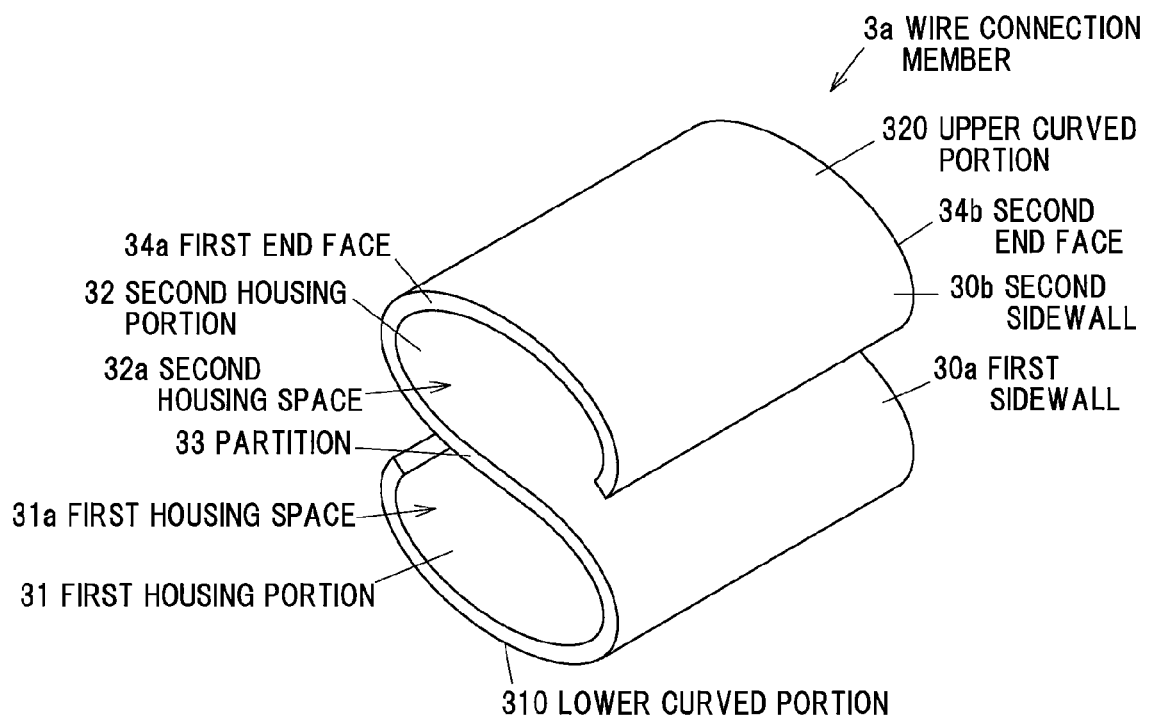
FIG. 4 is a perspective view showing a first wire connection member.

FIG. 4 is a perspective view showing the first wire connection member 3a. FIG. 5 is an explanatory diagram for explaining electrical connection between the first annular wire 41 and the first power supply line 43 using the first wire connection member 3a.

The first wire connection member 3a connects the first annular wire 41 as a first wire to the first power supply line 43 as a second wire by crimping. In the first embodiment, as shown in FIG. 5, both of end portions (tip portions 41a and 41b) of the first annular wire 41 formed using a solid wire are connected to a tip portion 431a of the first power supply line 43 by the first wire connection member 3a, which practically means that the first wire connection member 3a connects two solid wires to one twisted wire.

As shown in FIG. 5, the twisted wire 431 of the first power supply line 43 is formed by helically twisting plural strands 431b. Note that, although the thickness of the strand 431b is exaggeratingly shown in FIG. 5 for the purpose of explanation, a diameter of the strand 431b is, e.g., 0.05 to 0.5 mm and multiple strands 431b (e.g., more than ten strands) are twisted together to form the twisted wire 431. Thus, the first power supply line 43 has higher flexibility than the first annular wire 41. This improves routing properties of the electricity collection and distribution ring 1.

As shown in FIG. 4, the first wire connection member 3a has a partition 33 which divides a first housing space 31a for housing the tip portions 41a and 41b of the first annular wire 41 from a second housing space 32a for housing the tip portion 431a of the first power supply line 43, a first housing portion 31 which, together with the partition 33, forms the first housing space 31a, and a second housing portion 32 which, together with the partition 33, forms the second housing space 32a. In addition, the partition 33 is arranged between the first housing portion 31 and the second housing portion 32 which are arranged side-by-side in a radial direction with respect to the axial direction of the tip portions 41a and 41b of the first annular wire 41 and the tip portion 431a of the first power supply line 43. That is, the first housing portion 31 and the second housing portion 32 are arranged to be overlapped in a direction crossing a direction of inserting (housing) the first annular wire 41 and the first power supply line 43 into the first and second housing portions 31 and 32.

Here, the axial direction of the first annular wire 41 is a direction of axes $m_1$ and $m_2$ (see FIG. 5) both of which are the central axis of the metal conductor 411 formed using a solid wire the tip portions 41a and 41b. Meanwhile, the axial direction of the first power supply line 43 is a direction of axis $m_3$ (see FIG. 5) which is the central axis of the first power supply line 43 at the tip portion 431a. In other words, the tip portions 41a and 41b of the first annular wire 41 and the tip portion 431a of the first power supply line 43 are connected in an overlapping manner via the partition 33 as viewed from a radial direction which is orthogonal to the axes $m_1$, $m_2$ and $m_3$.

The first housing portion 31, the second housing portion 32 and the partition 33 of the first wire connection member 3a are integrally formed by bending a plate-like metal member. In other words, a single-plate metal member having a rectangular shape is bent into an S-shape by plastic deformation, thereby forming the first wire connection member 3a. The metal member can be formed of a conductive metal material such as iron or copper, or an alloy material containing such metals.

The first housing portion 31 is constructed from a first sidewall 30a which is curved so that the first housing space 31a having an ellipse shape is formed between itself and the partition 33. The second housing portion 32 is constructed from a second sidewall 30b which is curved so that the second housing space 32a having an ellipse shape is formed between itself and the partition 33. That is, the first housing portion 31 and the second housing portion 32 are arranged adjacent to each other with a single metal plate as the partition 33 interposed therebetween.

A portion of the first sidewall 30a facing the partition 33 in an arrangement direction of the first housing portion 31 and the second housing portion 32 serves as a lower curved portion 310 which has a curved shape with a smaller curvature than other portion of the first sidewall 30a. Meanwhile, a portion of the second sidewall 30b facing the partition 33 in the arrangement direction of the first housing portion 31 and the second housing portion 32 serves as an upper curved portion 320 which has a curved shape with a smaller curvature than other portion of the second sidewall 30b.

Method of Connecting First Annular Wire 41 to First Power Supply Line 43

Figure 6A:
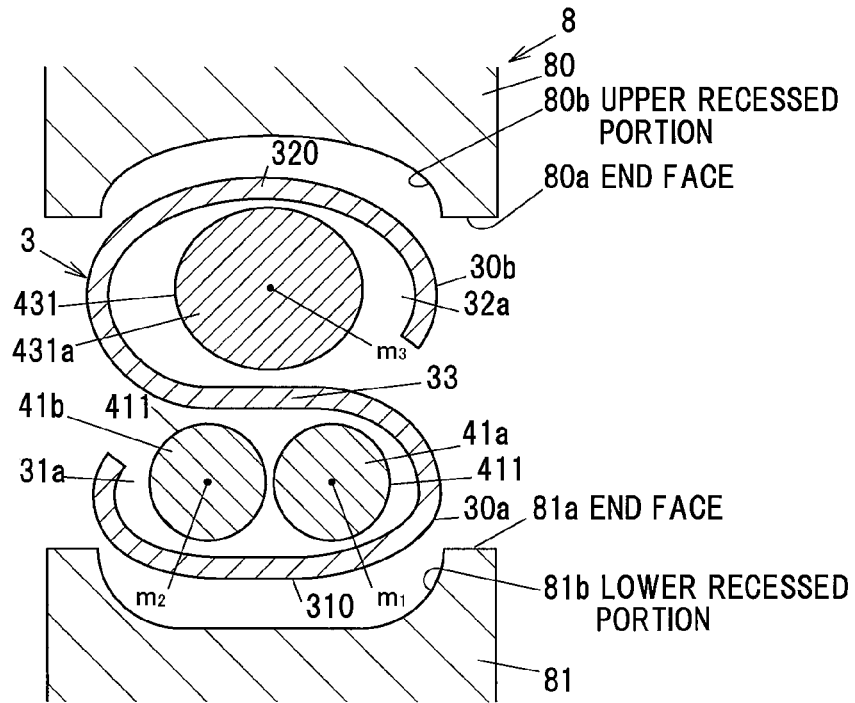
Figure 6B:
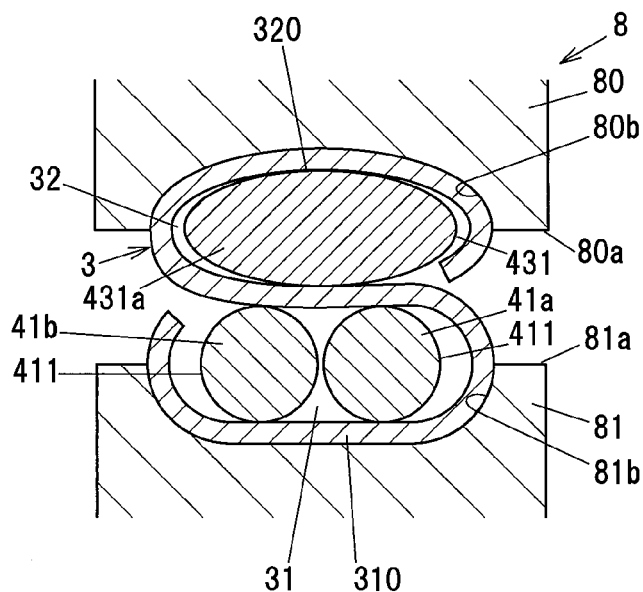

FIGS. 6A and 6B show a crimping process in which the first annular wire 41 is connected to the first power supply line 43 by crimping the first wire connection member 3a in the arrangement direction of the first housing portion 31 and the second housing portion 32, wherein FIG. 6A shows a state before crimping and FIG. 6B shows a state when the crimping is completed. FIGS. 6A and 6B are cross sectional views showing the first wire connection member 3a, an upper electrode 80 and a lower electrode 81 taken in line A-A in FIG. 5.

In the first embodiment, for connecting the first annular wire 41 to the first power supply line 43 by the first wire connection member 3a, a crimping electrode 8 shown in FIGS. 6A and 6B is used and connection is carried out by fusing (heat crimping) which is solid-state welding to join solid objects to each other. In addition, in the first embodiment, compressing the first housing portion 31 and the second housing portion 32 in the arrangement direction thereof with the partition 33 interposed therebetween causes the first annular wire 41 to come into contact with the first housing portion 31 as well as the partition 33 and the power supply line 43 to come into contact with the second housing portion 32 as well as the partition 33, thereby electrically connecting the first annular wire 41 to the power supply line 43. This connection method will be described in detail below.

For connecting the first annular wire 41 to the power supply line 43, firstly, the first annular wire 41 and the power supply line 43 are inserted into the first wire connection member 3a respectively from housing directions $D_1$ and $D_2$ shown in FIG. 5. The housing directions $D_1$ and $D_2$ are opposite directions.

In more detail, the tip portions 41a and 41b of the metal conductor 411 of the first annular wire 41 are inserted into the first wire connection member 3a from a first end face 34a side so as to be housed in the first housing space 31a, and the tip portion 431a of the twisted wire 431 of the first power supply line 43 is inserted from a second end face 34b side, which is opposite to the first end face 34a, so as to be housed in the second housing space 32a.

Next, as shown in FIG. 6A, the first wire connection member 3a is placed on the crimping electrode 8 so that the upper electrode 80 of the crimping electrode 8 is located on the upper curved portion 320 side of the second housing portion 32 of the first wire connection member 3a and the lower electrode 81 is located on the lower curved portion 310 side of the first housing portion 31. At this time, the partition 33 and the lower curved portion 310 are positioned so that at least the center portions thereof in an arrangement direction of the tip portions 41a and 41b of the first annular wire 41 are orthogonal to a relative movement direction of the upper electrode 80 and the lower electrode 81. This prevents the tip portions 41a and 41b of the first annular wire 41 and the tip portion 431a of the twisted wire 431 of the first power supply line 43 from slipping along the partition 33 at the time of crimping, and the positions thereof are thus stabilized.

Next, as shown in FIG. 6B, an end face 80a of the upper electrode 80 and an end face 81a of the lower electrode 81 are brought close to each other by relatively moving the upper electrode 80 and the lower electrode 81, and the first wire connection member 3a is crimped by applying pressure. By crimping the first wire connection member 3a, the tip portions 41a and 41b of the first annular wire 41 come into contact with the lower curved portion 310 and the partition 33 in the first housing portion 31 and are sandwiched therebetween. In addition, the tip portion 431a of the twisted wire 431 of the first power supply line 43 comes into contact with the upper curved portion 320 and the partition 33 in the second housing portion and is sandwiched therebetween.

Here, as shown in FIGS. 6A and 6B, an upper recessed portion 80b to be in contact with the upper curved portion 320 is provided on the upper electrode 80. The upper recessed portion 80b is a groove formed along a direction of length L of the first wire connection member 3a shown in FIG. 5, i.e., along an axial direction of the first wire connection member 3a, and has an inner surface forming a substantially semi-elliptical shape as viewed from the axial direction.

Meanwhile, a lower recessed portion 81b to be in contact with the lower curved portion 310 is provided on the end face 81a of the lower electrode 81. The lower recessed portion 81b is a groove formed along the direction of length L of the first wire connection member 3a and has an inner surface forming a shape which is flat in the middle and is rounded at both ends as viewed from the axial direction. The middle portion is made flat since it is easy to align the tip portions 41a and 41b of the metal conductor 411 and a crimping force is thus evenly applied thereto.

Next, after a distance between the end face 80a of the upper electrode 80 and the end face 81a of the lower electrode 81 reaches a predetermined distance, i.e., after a predetermined pressure is applied to the first wire connection member 3a, an electric current is supplied by a non-illustrated power unit from the upper electrode 80 to the lower electrode 81 or vice versa. This electric current generates Joule heat inside the metal conductor 411 of the first annular wire 41 and the twisted wire 431 of the first power supply line 43 as well as at the contact portions between the metal conductor 411/the twisted wire 431 and the first wire connection member 3a, and temperature of the metal conductor 411, the twisted wire 431 and the first wire connection member 3a thus increases. Then, the metal conductor 411 and the twisted wire 431 are welded to the first wire connection member 3a due to the increase in temperature.

Next, after stopping current supply, the upper electrode 80 and the lower electrode 81 are relatively moved in a direction of separating from each other to take out the first wire connection member 3a in which the first annular wire 41 and the first power supply line 43 are crimped. As a result, the first bus ring 4 in which the first annular wire 41 and the first power supply line 43 are connected by the first wire connection member 3a is obtained. Note that, the second bus ring 5 and the third bus ring 6 are obtained in the same manner as the first bus ring 4.

Functions and Effects of the First Embodiment

The following functions and effects are obtained in the first embodiment.

(1) In the first wire connection member 3a, the partition 33 is arranged between the first housing portion 31 and the second housing portion 32, such that the first housing space 31a overlaps with the second housing space 32a via the partition 33 in the radial direction with respect to the axial direction of the first annular wire 41 and the first power supply line 43. Thus, in a state that the first annular wire 41 and the first power supply line 43 are connected by the first wire connection member 3a, the tip portions 41a and 41b of the metal conductor 411 and the tip portion 431a of the first power supply line 43 overlap and this allows the length of the connected portion between the first annular wire 41 and the first power supply line 43 (length of the first wire connection member 3a) to be reduced. Therefore, the outwardly protruding length of the power supply line-supporting portion 23 of the holding member 2 can be reduced and it is thereby possible to reduce a size of the electricity collection and distribution ring 1.

(2) Since the first housing space 31a and the second housing space 32a are divided by the partition 33, the tip portions 41a and 41b of the first annular wire 41 are not directly in contact with the tip portion 431a of the first power supply line 43. Since this prevents the strands 431b of the first power supply line 43 from entering a gap between the tip portions 41a and 41b of the first annular wire 41 and the inner surface of the first housing portion 31, it is possible to crimp the twisted wire 431 of the first power supply line 43 by an appropriate crimping force and thus to prevent the first power supply line 43 from slipping out of the first wire connection member 3a.

(3) Since the first annular wire 41 and the first power supply line 43 are crimped together by the first wire connection member 3a, there are fewer processes than the case of separately crimping the first annular wire 41 and the first power supply line 43 and it is thus possible to reduce the cost.

(4) Since the first housing portion 31 and the second housing portion 32 are arranged with a single metal plate as the partition 33 interposed therebetween, the first housing portion 31 can be located adjacent to the second housing portion 32 with a short distance and it is thus possible to reduce a size of the first wire connection member 3a.

(5) Since the first wire connection member 3a has the upper curved portion 320 having a shape corresponding the upper recessed portion 80b of the upper electrode 80 of the crimping electrode 8 used for crimping and the lower curved portion 310 having a shape corresponding to the lower recessed portion 81b of the lower electrode 81, it is possible to reliably place the first wire connection member 3a at a designated position between the upper electrode 80 and the lower electrode 81 of the lower electrode 81 and thus possible to crimp appropriately.

Although the above (1) to (5) have been described as the functions and effects obtained in case of using the first wire connection member 3a to connect the first annular wire 41 to the first power supply line 43 in the first bus ring 4, it is also possible to obtain the same functions and effects in case of using the second wire connection member 3b to connect the second annular wire 51 to the second power supply line 53 in the second bus ring 5 and in case of using the third wire connection member 3c to connect the third annular wire 61 to the third power supply line 63 in the third bus ring 6.

Second Embodiment

Next, the second embodiment of the invention will be described in reference to FIGS. 7 to 9B.

Figure 7:
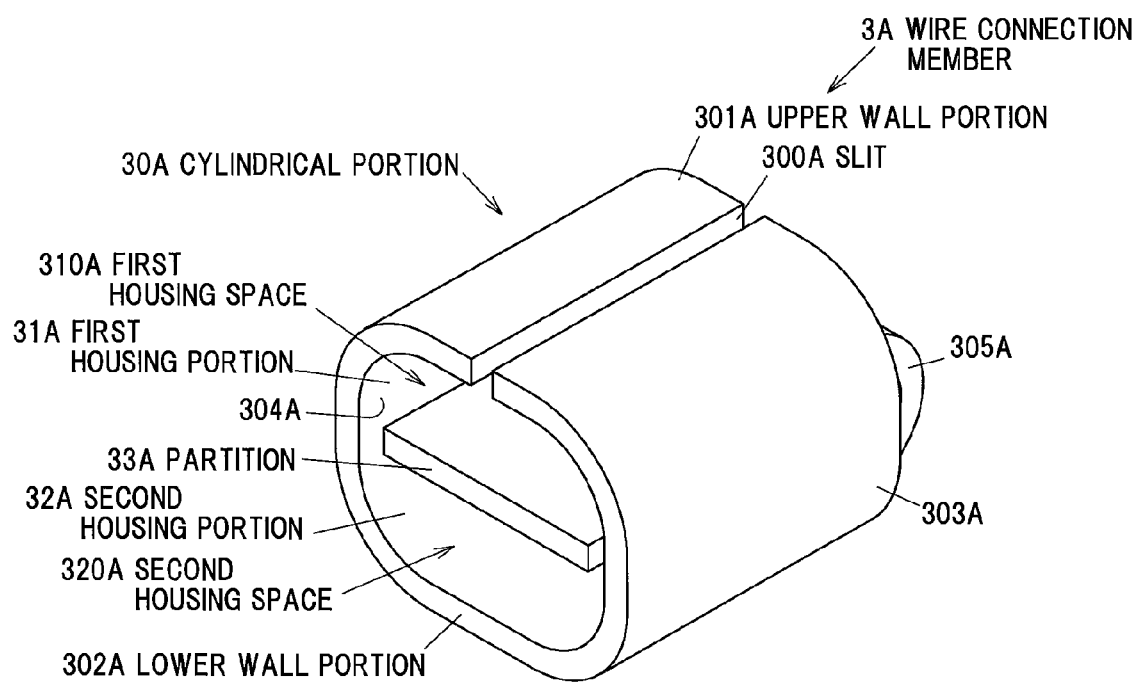
FIG. 7 is a perspective view showing a wire connection member 3A in a second embodiment of the invention.
Figure 8B:
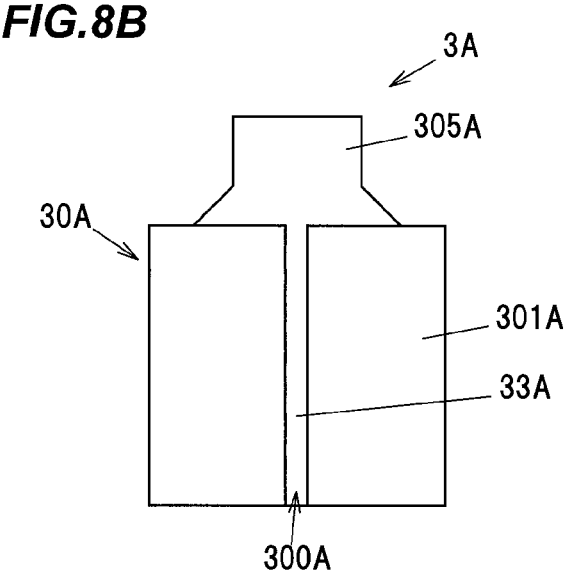
Figure 8A:
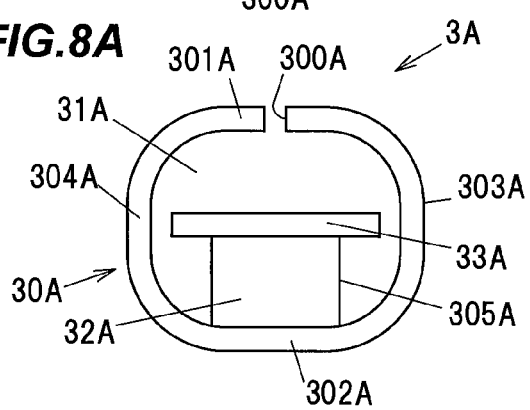
Figure 8C:
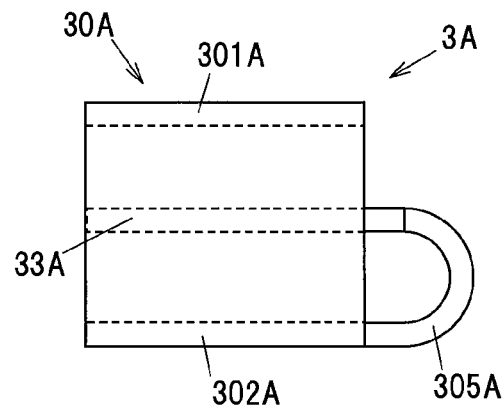
Figure 8D:
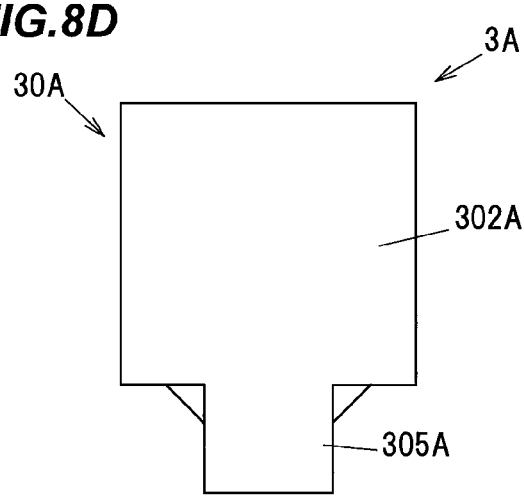
Figure 9A:
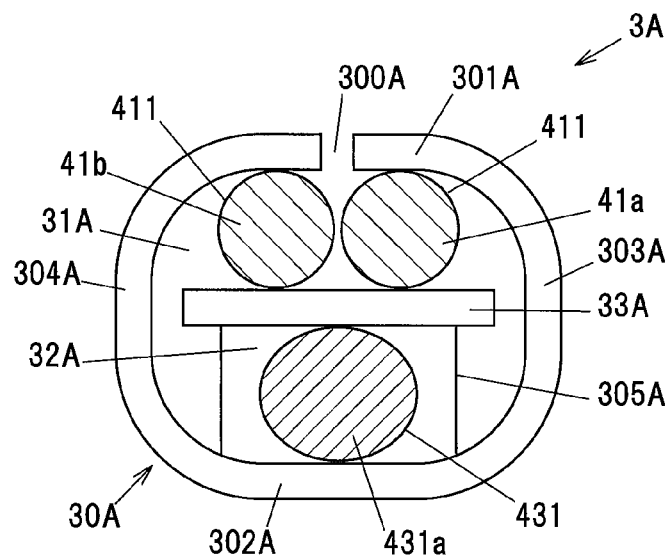
Figure 9B:
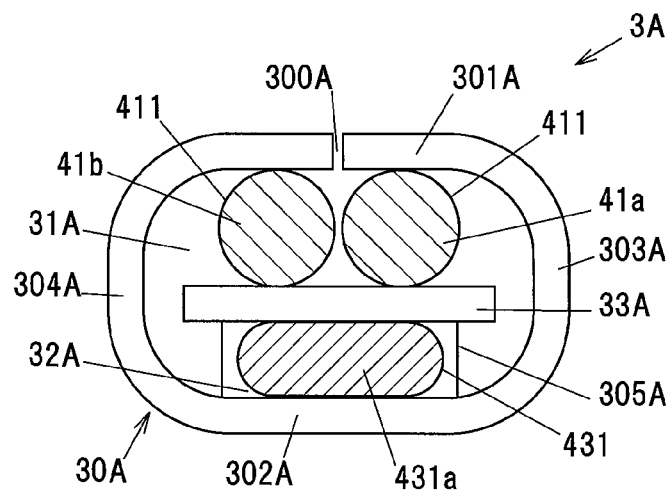

FIG. 7 is a perspective view showing a wire connection member 3A in the second embodiment of the invention. FIGS. 8A to 8D are projection views showing the wire connection member 3A, wherein FIG. 8A is a front view, FIG. 8B is a plan view, FIG. 8C is a right side view and FIG. 8D is a bottom view. FIGS. 9A and 9B are schematic views showing a process of crimping the wire connection member 3A, wherein FIG. 9A shows a state before crimping and FIG. 9B shows a state after crimping.

Configuration of Wire Connection Member 3A

As shown in FIGS. 7 to 9B, the wire connection member 3A in the second embodiment integrally has a partition 33A which divides a first housing space 310A for housing the tip portions 41a and 41b of the first annular wire 41 from a second housing space 320A for housing the tip portion 431a of the first power supply line 43, a first housing portion 31A which, together with the partition 33A, forms the first housing space 310A, and a second housing portion 32A which, together with the partition 33A, forms the second housing space 320A. The partition 33A is arranged between the first housing portion 31A and the second housing portion 32A which are arranged side-by-side in a radial direction with respect to the axial direction of the tip portions 41a and 41b of the first annular wire 41 and the tip portion 431a of the first power supply line 43.

In more detail, in the wire connection member 3A, an inner space of a cylindrical portion 30A formed into a cylindrical shape by bending a plate-like metal member is divided into two spaces by the partition 33A which is a single plate, such that the one of the divided inner spaces serves as the first housing space 310A and another as the second housing space 320A.

In the second embodiment, the cylindrical portion 30A is formed in a rectangular cylindrical shape with rounded corners. The cylindrical portion 30A is composed of an upper wall portion 301A, a lower wall portion 302A and first and second sidewall portions 303A and 304A. The upper wall portion 301A has a slit 300A formed in the middle between end faces of the bent plate-like metal member. The lower wall portion 302A faces the upper wall portion 301A with the partition 33A interposed therebetween. The first and second sidewall portions 303A and 304A face each other and each couple the upper wall portion 301A to the lower wall portion 302A.

The partition 33A is coupled to and integrated with the cylindrical portion 30A by a coupling portion 305A which extends from the lower wall portion 302A in a curved manner. The partition 33A is formed inside the cylindrical portion 30A so as to have a wider width than the coupling portion 305A. The first housing portion 31A has a U-shape formed by the upper wall portion 301A and portions of the first and second sidewall portions 303A and 304A on the upper wall portion 301A side with respect to the partition 33A. The second housing portion 32A has a U-shape formed by the lower wall portion 302A and portions of the first and second sidewall portions 303A and 304A on the lower wall portion 302A side with respect to the partition 33A.

For connecting the first annular wire 41 to the power supply line 43 by the wire connection member 3A, the tip portions 41a and 41b of the first annular wire 41 are placed in the first housing space 310A and the tip portion 431a of the first power supply line 43 is placed in the second housing space 320A, as shown in FIG. 9A. Then, the wire connection member 3A is pressed by a non-illustrated upper jig coming into contact with the upper wall portion 301A of the cylindrical portion 30A and a non-illustrated lower jig coming into contact with the lower wall portion 302A of the cylindrical portion 30A, thereby compressing the first housing portion 31A and the second housing portion 32A with the partition 33A interposed therebetween in an arrangement direction of the first housing portion 31A and the second housing portion 32A.

By crimping the wire connection member 3A, the tip portions 41a and 41b of the first annular wire 41 come into contact with the upper wall portion 301A and the partition 33A and are sandwiched therebetween. In addition, the tip portion 431a of the first power supply line 43 comes into contact with the lower wall portion 302A and the partition 33A and is sandwiched therebetween. As a result, the first annular wire 41 is electrically connected to the first power supply line 43 via the wire connection member 3A.

Note that, the tip portions 41a and 41b of the first annular wire 41 and the tip portion 431a of the first power supply line 43 may be welded to the wire connection member 3A by supplying an electric current between the upper and lower jigs in a state that the wire connection member 3A is pressed.

The same functions and effects as (1) to (4) described in the first embodiment are also obtained in the second embodiment. In addition, since the tip portions 41a and 41b of the first annular wire 41 and the tip portion 431a of the first power supply line 43 are crimped inside the cylindrical portion 30A, it is possible to stabilize the positions of the tip portions 41a and 41b of the first annular wire 41 and the tip portion 431a of the first power supply line 43 at the time of crimping.

Third Embodiment

Figure 10:
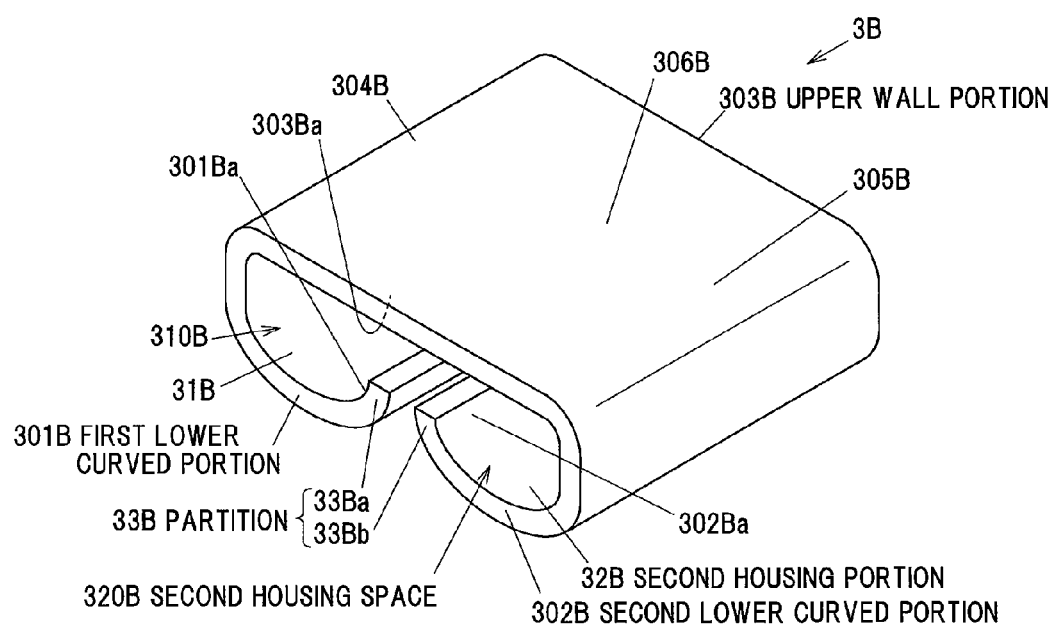
FIG. 10 is a perspective view showing a configuration of a wire connection member in a third embodiment of the invention.

Next, the third embodiment of the invention will be described in reference to FIGS. 10 to 11B. FIG. 10 is a perspective view showing a configuration of a wire connection member 3B in the third embodiment of the invention.

Configuration of Wire Connection Member 3B

The wire connection member 3B has a partition 33B which divides a first housing space 310B for housing the tip portions 41a and 41b of the first annular wire 41 from a second housing space 320B for housing the tip portion 431a of the first power supply line 43, a first housing portion 31B which, together with the partition 33B, forms the first housing space 310B, and a second housing portion 32B which, together with the partition 33B, forms the second housing space 320B. The partition 33B is arranged between the first housing portion 31B and the second housing portion 32B which are arranged side-by-side in a radial direction with respect to the axial direction of the tip portions 41a and 41b of the first annular wire 41 and the tip portion 431a of the first power supply line 43.

The wire connection member 3B is formed by bending a material which is a plate-like metal member having a band-like shape. In more detail, a first lower curved portion 301B and a second lower curved portion 302B are formed by bending both longitudinal end portions of the material in a folded-back manner and the longitudinal middle portion of the material serves as an upper wall portion 303B which faces the first and second lower curved portions 301B and 302B.

An end portion 304B of the upper wall portion 303B, together with the first lower curved portion 301B, forms the first housing portion 31B while another end portion 305B of the upper wall portion 303B, together with the second lower curved portion 302B, forms the second housing portion 32B. In addition, a middle portion 306B located between the end portions 304B and 305B of the upper wall portion 303B serves as a coupling portion to couple the first housing portion 31B to the second housing portion 32B.

In the third embodiment, the upper wall portion 303B has a flat-plate shape, and the first housing space 310B of the first housing portion 31B and the second housing space 320B of the second housing portion 32B are formed on a lower surface 303Ba side of the upper wall portion 303B.

An end portion 301Ba of the first lower curved portion 301B and an end portion 302Ba of the second lower curved portion 302B, which face each other along the lower surface 303Ba of the upper wall portion 303B, serve as the partition 33B dividing the housing space 310B of the first housing portion 31B from the housing space 320B of the second housing portion 32B. In more detail, the end portion 301Ba of the first lower curved portion 301B serves as a first partition 33Ba, the end portion 302Ba of the second lower curved portion 302B serves as a second partition 33Bb, and the partition 33B is composed of a combination of the first partition 33Ba and the second partition 33Bb.

Figure 11A:
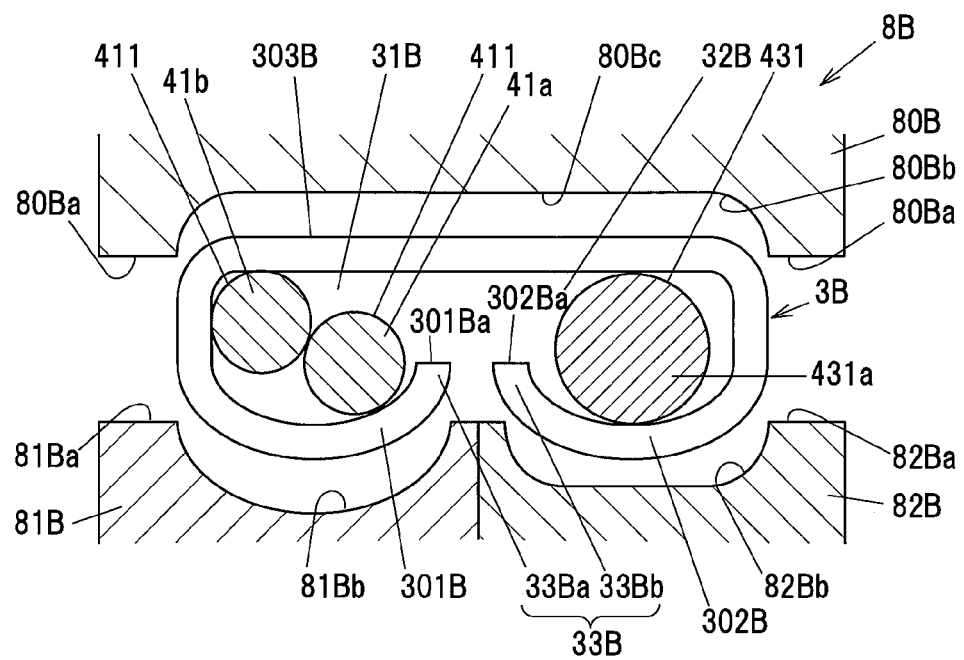
Figure 11B:
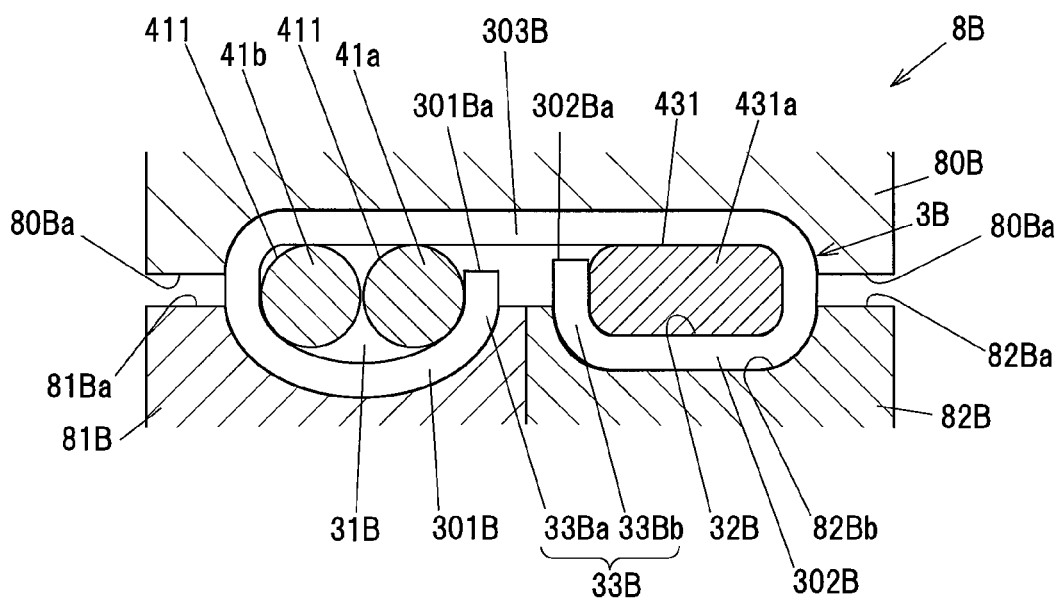

FIGS. 11A and 11B are schematic views showing a process of crimping the wire connection member 3B, wherein FIG. 11A shows a state before crimping and FIG. 11B shows a state after crimping.

The wire connection member 3B is crimped by a crimping electrode 8B in a state that the tip portions 41a and 41b of the first annular wire 41 are housed in the first housing portion 31B and the tip portion 431a of the first power supply line 43 is housed in the second housing portion 32B, thereby electrically connecting the first annular wire 41 to the first power supply line 43. In the third embodiment, connection is carried out by fusing (heat crimping).

As shown in FIGS. 11A and 11B, the crimping electrode 8B is composed of an upper electrode 80B, a first lower electrode 81B and a second lower electrode 82B. Each of the first lower electrode 81B and the second lower electrode 82B is independently relatively movable in an approaching/separating direction with respect to the upper electrode S0B.

An upper recessed portion 80Bb having a bottom surface 80Bc to be in contact with the upper wall portion 303B of the wire connection member 3B is provided on an upper end face 80Ba of the upper electrode 80B. The upper recessed portion 80Bb is a groove formed along a direction of inserting the tip portions 41a and 41b of the first annular wire 41 into the first housing portion 31B. In addition, in the upper recessed portion 80Bb, the bottom surface 80Bc located in the middle in a width direction orthogonal to an extending direction thereof is a flat surface and end portions on both sides of the bottom surface 80Bc are curved in a rounded manner.

The first lower electrode 81B is provided with a lower recessed portion 81Bb on an end face 81Ba which faces the upper electrode 80B. The lower recessed portion 81Bb is a groove extending parallel to the upper recessed portion 80Bb and has a semi-elliptical shape which fits to the first lower curved portion 301B of the first housing portion 31B.

The second lower electrode 82B is provided with a lower recessed portion 82Bb on an end face 82Ba which faces the upper electrode 80B. The lower recessed portion 82Bb is a groove extending parallel to the upper recessed portion 80Bb and has a shape in which the widthwise middle portion is a flat surface and both end portions are curved in a rounded manner.

For connecting the first annular wire 41 to the power supply line 43 by crimping the wire connection member 3B, firstly, the first annular wire 41 is inserted into the first housing portion 31B and the power supply line 43 is inserted from the opposite side.

Next, as shown in FIG. 11A, the wire connection member 3B is placed on the crimping electrode 8B so that the upper electrode 80B of the crimping electrode 8B is located to face the upper wall portion 303B of the wire connection member 3B, the first lower electrode 81B is located to face the first lower curved portion 301B of the first housing portion 31B and the second lower electrode 82 is located to face the second lower curved portion 302B of the second housing portion 32B.

Next, as shown in FIG. 11B, pressure is applied to the wire connection member 3B by relatively moving the upper electrode 80B, the first lower electrode 81B and the second lower electrode 82B, and the wire connection member 3B is thereby compressed and crimped. At this time, the compression amount of the first housing portion 31B is not necessarily the same as that of the second housing portion 32B and may be different. In addition, a crimping force acting on the first housing portion 31B may be different from that acting on the second housing portion 32B.

Next, after a predetermined pressure is applied to the first and second housing portions 31B and 32B, an electric current is supplied from the upper electrode SOB to the first and second lower electrodes 81B, 82B or vice versa for fusing. This electric current generates Joule heat inside the metal conductor 411 of the first annular wire 41 and the twisted wire 431 of the first power supply line 43 as well as at the contact portions between the metal conductor 411/the twisted wire 431 and the wire connection member 3B, and temperature of the metal conductor 411, the twisted wire 431 and the wire connection member 3B thus increases. The metal conductor 411 and the twisted wire 431 are respectively welded to the wire connection member 3B due to the increase in temperature.

Next, after stopping current supply, the upper electrode SOB and the first and second lower electrodes 81B, 82B are relatively moved in a direction of separating from each other to take out the wire connection member 3B in which the first annular wire 41 and the first power supply line 43 are crimped.

Functions and Effects of the Third Embodiment

In the third embodiment, the same functions and effects as (1) to (3) described in the first embodiment are obtained. In addition, since each of the first lower electrode 81B and the second lower electrode 82B is independently relatively movable with respect to the upper electrode 80B, the compression amount of and crimping force acting on the first housing portion 31B and those of the second housing portion 32B can be separately adjusted so that the tip portions 41a and 41b of the first annular wire 41 and the tip portion 431a of the first power supply line 43 are appropriately connected. As a result, it is possible to reliably connect the first annular wire 41 to the first power supply line 43.

SUMMARY OF THE EMBODIMENTS

Technical ideas understood from the embodiments will be described below citing the reference numerals, etc., used for the embodiments. However, each reference numeral, etc., described below is not intended to limit the constituent elements in the claims to the members, etc., specifically described in the embodiments.

[1] A wire connection member (first to third wire connection member 3a to 3c, wire connection member 3A/3B) for connecting a first wire (first to third annular wire 41, 51, 61) to a second wire (first to third power supply line 43, 53, 63) by crimping, comprising: a partition (33/33A/33B) for dividing a first housing space (31a/310A/310B) for housing tip portions (41a, 41b) of the first wire (first to third annular wire 41, 51, 61) from a second housing space (32a/320A/320B) for housing a tip portion (431a) of the second wire (first to third power supply line 43, 53, 63); a first housing portion (31/31A/31B) which, together with the partition (33/33A/33B), forms the first housing space (31a/310A/310B); and a second housing portion (32/32A/32B) which, together with the partition (33/33A/33B), forms the second housing space (32a/320A/320B), wherein the partition (31/31A/31B) is arranged between the first housing portion (31/31A/31B) and the second housing portion (32/32A/32B).

[2] The wire connection member (first to third wire connection member 3a to 3c, wire connection member 3A/3B) described in the [1], wherein the first housing portion (31/31A/31B) and the second housing portion (32/32A/32B) are arranged side-by-side in a radial direction with respect to the axial direction of the first and second wires (first to third annular wire 41, 51, 61 and first to third power supply line 43, 53, 63).

[3] The wire connection member (first to third wire connection member 3a to 3c, wire connection member 3A/3B) described in the [1] or [2], wherein the first housing portion (31/31A/31B), the second housing portion (32/32A/32B) and the partition (33/33A/33B) are formed integrally by bending a plate-like metal member.

[4] The wire connection member (first to third wire connection member 3a to 3c, wire connection member 3A/3B) described in any of the [1] to [3], wherein the first housing portion (31/31A/31B) and the second housing portion (32/32A/32B) are arranged adjacent to each other with the partition (33/33A/33B) interposed therebetween, the partition (33/33A/33B) comprising a single metal plate.

[5] A wire connection structure (10), comprising: the first wire (first to third annular wire 41, 51, 61) and the second wire (first to third power supply line 43, 53, 63) connected by the wire connection member (first to third wire connection member 3a to 3c, wire connection member 3A/3B) described in any of the [1] to [4], wherein the first wire (first to third annular wire 41, 51, 61) comprises one or two solid wires, and the second wire (first to third power supply line 43, 53, 63) comprises a twisted wire formed by twisting a plurality of strands.

[6] The wire connection structure described in the [5], wherein compressing the first housing portion (31/31A/31B) and the second housing portion (32/32A/32B) in an arrangement direction thereof with the partition (33/33A/33B) interposed therebetween causes the first wire (first to third annular wire 41, 51, 61) to come into contact with the first housing portion (31/31A/31B) and the partition (33/33A/33B) and the second wire (first to third power supply line 43, 53, 63) to come into contact with the second housing portion (32/32A/32B) and the partition (33/33A/33B), and the first wire (first to third annular wire 41, 51, 61) is thereby electrically connected to the second wire (first to third power supply line 43, 53, 63).

[7] An annular power distribution member (first to third bus ring 4, 5, 6), comprising; an annular wire (first to third annular wire 41, 51, 61) comprising a solid wire (metal conductor 411, 511, 611) formed in an annular shape and having connecting terminals (first to third connecting terminals 42, 52, 62) fixed at a plurality of positions in the circumferential direction; a power supply line (first to third power supply line 43, 53, 63) comprising a twisted wire (431, 531, 631) and supplying power to the annular wire (first to third annular wire 41, 51, 61); and a wire connection member (first to third wire connection member 3a to 3c, wire connection member 3A/3B) connecting both end portions (tip portions 41a, 41b) of the annular wire (first to third annular wire 41, 51, 61) to a tip portion (431a) of the power supply line (first to third power supply line 43, 53, 63), wherein the wire connection member (first to third wire connection) comprises a partition (33/33A/33B) for dividing a first housing space (31a/310A/310B) for housing both tip portions (41a, 41b) of the annular wire (first to third annular wire 41, 51, 61) from the second housing space (32a/320A/320B) for housing a tip portion (431a) of the power supply wire (first to third power supply line 43, 53, 63); a first housing portion (31/31A/31B) which, together with the partition (33/33A/33B), forms the first housing space (31a/310A/310B); and a second housing portion (32/32A/32B) which, together with the partition (33/33A/33B), forms the second housing space (32a/320A/320B), and the partition (33/33A/33B) is arranged between the first housing portion (31/31A/31B) and the second housing portion (32/32A/32B).

Although the embodiments of the invention have been described, the invention according to claims is not to be limited to the embodiments. Further, please note that all combinations of the features described in the embodiments are not necessary to solve the problem of the invention.

In addition, the invention can be appropriately modified and implemented without departing from the gist thereof. For example, although plural (two) solid wires (the tip portions 41a and 41b of the first annular wire 41) are housed in the first housing portion 31, 31A or 31B in the first to third embodiments, it is not limited thereto. The number of solid wires housed in the first housing portion 31, 31A or 31B may be one. In addition, the connection members 3a to 3c, 3A and 3B in the first to third embodiments are applicable not only to the electricity collection and distribution ring 1 used for collecting and distributing electricity form/to an electric motor but also to connection between wires in various applications.

What is claimed is:

1. An annular power distribution member, comprising;
   an annular wire comprising a solid wire formed in an annular shape and having connecting terminals fixed at a plurality of positions in the circumferential direction;
   a power supply line comprising a twisted wire and supplying power to the annular wire; and
   a wire connection member connecting both end portions of the annular wire to a tip portion of the power supply line,
   wherein the wire connection member comprises a partition for dividing a first housing space for housing both end portions of the annular wire from a second housing space for housing a tip portion of the power supply line;
   a first housing portion that, together with the partition, forms the first housing space; and a second housing portion that, together with the partition, forms the second housing space, and the partition is arranged between the first and second housing portions,
   wherein both ends of the annular wire protrude outwardly from the annular wire and are inserted into the first housing space toward an outward direction of the annular wire,
   wherein a tip portion of the power supply line is inserted into the second housing space toward an inward direction of the annular wire,
   wherein the both ends of the annular wire, the tip portion of the power supply line and the wire connection member are covered with a molding resin.

2. The wire connection member according to claim 1, wherein the first and second housing portions are arranged side-by-side in a radial direction.

3. The wire connection member according to claim 1, wherein the first and second housing portions and the partition are formed by a one-piece construction of a bent, S-shaped plate-like metal member.

4. The wire connection member according to claim 1, wherein the first and second housing portions are arranged adjacent to each other with the partition interposed therebetween, the partition comprising a single metal plate.

5. The wire connection structure according to claim 3, wherein the first and second housing portions formed by the S-shape of the bent plate-like member are compressed in a vertical direction with respect to the S-shape such that the first wire contacts with the first housing portion and the partition, the second wire contacts with the second housing portion and the partition and the first wire is thereby electrically connected to the second wire.

* * * * *